Patented Aug. 21, 1973

3,754,079
PROCESS OF PREPARING CHLORINE DIOXIDE
Joseph Callerame, Rochester, N.Y., assignor to
Chemical Generators, Inc., Rochester, N.Y.
No Drawing. Continuation of abandoned application Ser.
No. 15,290, Feb. 27, 1970. This application May 19,
1972, Ser. No. 255,018
Int. Cl. C01b 11/02
U.S. Cl. 423—479                                              8 Claims

ABSTRACT OF THE DISCLOSURE

Chlorine dioxide is prepared by reacting nitrosyl chloride with a chlorite or chlorate of an alkali metal or alkaline earth metal. The nitrosyl chloride necessary for the reaction is advantageously prepared in situ by the reaction of nitric acid and a metal chloride such as an alkali metal chloride.

---

This is a continuation of application Ser. No. 15,290, filed Feb. 27, 1970, now abandoned.

BACKGROUND INFORMATION AND PRIOR ART

Chlorine dioxide is of considerable industrial importance and has found use in the bleaching of wood pulp, fats, oils and flour. Generally, chlorine dioxide is used as a bleaching agent and for removing undesirable tastes and odors from water and the like liquids. More recently it has been used as an anti-pollutant. The use of chlorine dioxide is particularly popular in swimming pools. For several of the established uses of the chlorine dioxide, it is desirable to produce the gas in situ so that the chlorine dioxide, upon formation, can be directly put to use either in gaseous form or, after absorption, in the form of an aqueous solution. In many instances, the use of chlorine dioxide in solution rather than in gaseous form is preferred.

Various processes have been proposed for the purpose of producing chlorine dioxide. It has thus been suggested to subject an aqueous lithium chlorite solution to electrolysis in a cell wherein the anode is separated from the cathode by a semi-permeable membrane. This proposal which is thus based on electrical migration through a semipermeable membrane resulting in dissociation of the lithium chlorite molecule was followed by the suggestion of producing chlorine dioxide by ion exchange wherein alkali metal chlorites as well as alkaline earth metal chlorites formed chlorous acid.

SUMMARY OF THE INVENTION

It is a primary object of the invention to provide a novel process for preparing chlorine dioxide which is exceedingly simple to carry out and according to which the chlorine dioxide is obtained in very high yields.

Another object of the invention is to propose a chlorine dioxide production process which requires but a minimum of apparatus.

Generally, it is an object of the invention to improve on the art of chlorine dioxide production as presently practiced.

Briefly, and in accordance with the invention chlorine dioxide is produced by the reaction of nitrosyl chloride with a chlorite or chlorate of an alkali metal or alkaline earth metal. As applied, for example, to sodium chlorate the reaction proceeds according to the following reaction scheme:

$$NaClO_3 + NOCl \rightarrow 2ClO_2 + Na^+ + N^+$$

Due to the known instability of nitrosyl chloride and also its relatievly high cost, it is recommended to prepare the nitrosyl chloride in situ from nitric acid and a chloride, for example, a metal chloride such as sodium or potassium chloride. Thus, sodium chloride and nitric acid react as follows:

$$3NaCl + 4HNO_3 \rightarrow Cl_2 + NOCl + 2H_2O + 3NaNO_3$$

The overal reaction that applies to a chlorate may thus be represented by the following scheme:

$$3NaCl + 4HNO_3 + NaClO_2 \rightarrow 2ClO_2 \\ + 2NaCl + H_2O + 2NaNO_3 + 2HNO_2$$

If the reaction is carried out with a chlorite as distinguished from a chlorate, the reaction may be represented by the following reaction scheme:

$$NaClO_2 + 3NaCl + 4HNO_3 \rightarrow 2ClO_2 \\ + 2NaCl + H_2O + NaNO_3 + NaNO_2 + 2HNO_2$$

It will thus be noted that a one step procedure can be applied in which the reactants are supplied so that nitrosyl chloride is first formed from nitric acid and a metal chloride, whereupon the generated nitrosyl chloride reacts with the alkali metal or alkaline earth metal chloride or chlorate to form chlorine dioxide.

The reaction is readily controllable, is not essentially exothermic and goes relatively rapidly to completion.

The reaction should be carried out in corrosion resistant reaction vessels, which of course does not constitute any difficulty in view of the general availability of corrosion resistant materials or reaction vessels having corrosion resistant linings.

Although it has been stated that the nitrosyl chloride is advantageously prepared in situ for immediate further reaction with the chlorite or chlorate, it will be understood that it is at least theoretically feasible to supply previously prepared nitrosyl chloride for reaction with chlorate or chlorite. However, the advantage of producing the nitrosyl chloride in situ for immediate further reaction with chlorate or chlorite is that then no free chlorine will be produced. With a view to suppressing the formation of free chlorine, it is recommended that the chlorate and the chloride are premixed prior to the reaction with nitric acid. However, it is also feasible to premix the nitric acid and the chlorate prior to the addition of the chloride. In either premixing arrangement, the premix can be stored for long periods of time before the addition of the other reactant. If nitric acid and chlorate are premixed, no appreciable reaction sets in, and in any event any reaction that may take place occurs very slowly and does not affect the subsequent reaction between the nitric acid and the chloride. If chloride and chlorate are premixed, this may be done in dry condition or in the presence of water so as to form a heavy slurry. Irrespective of the premixing procedure it will be appreciated that all three reactants, to wit, nitric acid, chloride and chlorate have to be present with a view to forming the desired chlorine dioxide.

It is also feasible to use mixtures of chlorite and chlorate. Thus, for example, the nitric acid and the metal chloride may be reacted with a mixture of sodium chlorite and sodium chlorate. However, the metal ion of the chlorite and chlorate need not be the same so that, for example, a mixture of sodium chlorite and barium chlorate could be used.

The inventive process can, of course, successfully be employed as a separate step in the sense of an after-treatment in procedures in which nitrosyl chloride is formed as a reaction product so that the formed nitrosyl chloride can then immediately be reacted in accordance with the invention. Thus, for example, in the so-called salt process for the production of chlorine, nitrosyl chloride is formed as a by-product. This nitrosyl chloride may then directly be reacted with a chlorite and/or chlorate in accordance with the invention.

The invention will now be described by several examples, it being understood, however, that these examples are given by way of illustration and not by way of limitation and that many changes may be effected without affecting in any way the scope and spirit of this invention as recited in the appended claims.

EXAMPLE 1

The reaction was carried out with five grams of sodium chloride, 2 grams of sodium chlorate and 2 cc. of nitric acid (70% concentration). The chloride and the chlorate were first mixed and placed in a long neck, round bottom flask fitted with a tight fitting neoprene stopper. The flask with the chloride-chlorate mixture was immersed in a water bath. A thistle tube was placed through a hole in the stopper and nitric acid was added through the tube whereupon the tube was closed. The stopper had a second hole through which a thermometer was pushed. The thermometer was placed so that its mercury bulb was just touching the liquid level in the flask. Immediately upon addition of nitric acid the temperature was read on the thermometer as indicating 25° C. The reaction was permitted to proceed to completion without that any temperature change from the indicated 25° C. value could be observed. The chlorine dioxide produced in the flask was withdrawn and absorbed in water.

The temperature of the water bath during the entire experiment stayed at room temperature.

EXAMPLE 2

The test of Example 1 was repeated but extraneous heat was applied to the flask by means of the water bath. The water bath was thus heated. The contents of the flask were carefully observed for characteristic changes due to temperature elevation. As the temperature reached 60° C. within the flask, the evolution of the characteristically yellow chlorine dioxide gas was extremely rapid. At 80° C. no significant amounts of yellow gas could be observed. The gas was withdrawn and stored.

EXAMPLE 3

The test of Example 1 was repeated but the flask was submerged in a salt ice bath. A much slower reaction took place with only negligible amounts of yellow gas being observed above the liquid level in the flask.

In each of Examples 1, 2 and 3 the gas was removed by rapid aeration of the flask and absorption of the gas in 500 cc. of water. The solutions obtained were compared for optical density at 340 mμ on a Beckman DBG. The following values were obtained:

|  | OD |
|---|---|
| Room temperature | .268 |
| High temperature | .271 |
| Low temperature | .183 |

From the values it can be concluded that the reaction goes to completion at room temperature or at elevated temperature without appreciable yield change. At low temperatures the yield change is significant. The reaction is not exothermic.

EXAMPLE 4

This example deals with the influence of pressure on the reaction. The reactants, to wit, 5 grams of sodium chloride, 2 grams of sodium chlorate and 2 cc. of nitric acid (70% concentration) were allowed to react in a heavy-walled container equipped with adequate glass tubing necessary to change the atmospheric pressure above the liquid level in the container. At 760 mm. Hg, to wit, ordinary atmospheric pressure, the chlorine dioxide evolution could be readily observed. At a pressure of 1240 mm. Hg it was observed that the reaction took place very slowly with the chlorine dioxide apparently remaining in the liquid phase. Attempts to collect the chlorine dioxide in the liquid phase and in the gas phase above the liquid were made and the sample was saved. At 50 mm. Hg, to wit, under partial vacuum conditions, the reaction proceeded rapidly and the yellow gas, to wit chlorine dioxide seemed to collect completely in the gas space of the container. The samples of chlorine dioxide produced at atmospheric, excess and sub-atmospheric pressures were collected by aeration and the chlorine dioxide was solubilized in 500 cc. of water and compared for OD. The following results were obtained:

|  | OD |
|---|---|
| Normal pressure | .270 |
| Excess pressure | .120 |
| Partial vacuum | .268 |

Because of the difficulty in collecting the high pressure sample, no clear conclusion can be expressed. However, in respect to the tests performed under partial vacuum conditions, less aeration of the liquid reactants was required to release the chlorine dioxide which was formed during the reaction stage.

EXAMPLE 5

This example deals with the influence of the relative proportions of the reactants. It was found that the reaction proceeds stoichiometrically.

(1) Increase in the amount of nitric acid.—If the amount of nitric acid is increased the solubility is decreased so that the chlorine dioxide is more readily expelled from the liquid phase. On the other hand, an increase in the nitric acid moiety has a tendency to cause the formation of nitrogen oxides which is undesirable.

(2) Increase in metal chloride such as sodium chloride.—If the sodium chloride or the like metal chloride is added to the reaction in excess amounts, to wit, amounts above the stoichiometric amounts, free chlorine is formed which for most purposes is undesired.

(3) Increase in chlorate.—No detrimental effect has been observed by adding excess amounts of chlorate. In this connection it should be observed that the chlorate only reacts with the nitrosyl chloride and not with the other reactants in the system. Thus, if an excess amount of chlorate is present it will simply remain in the reaction mixture in unreacted form.

Substantially quantitative yield results are obtained according to the overall equation if the components are added in substantially stoichiometrical proportions.

It was also investigated to what extent two of the three reactants react with each other in the absence of the third. Thus, it was found that nitric acid and, for example, sodium chlorate react to form chlorine dioxide if the reaction mixture is heated. However, laboratory studies indicated the presence of 60 to 70% of sodium chlorate in solution with nitric acid after aeration. Therefore only minor amounts of chlorine dioxide are formed by the direct reaction between nitric acid and alkali metal chlorate.

Sodium chlorite and sodium chlorate do not react with each other. The reaction of sodium chlorate and nitrosyl chloride (formed from nitric acid and sodium chloride) yields $ClO_2$ and NaN. In respect to the reaction of nitric acid and sodium chloride and sodium chlorate in which the nitrosyl chloride has been removed by absorption, similar results are obtained as in the reaction of nitric acid and sodium chlorate as discussed above.

From the above it can be readily concluded that the formation of the chlorine dioxide in the overall equation is a result of the reaction of nitrosyl chloride with the metal chlorate (or chlorite), the nitrosyl chloride in turn being produced in situ by nitric acid and metal chloride.

EXAMPLE 6

The following example deals with yield calculations:

(A) 106 g. $NaClO_3$ + 360 g. 70% $HNO$ + 174 g. of NaCl were allowed to react in a partial pressure chamber at 40° C. After 30 minutes, which was 5 minutes after the yellow color in the solution had disappeared, the chamber and solution were aerated. The total time was 36 minutes. The combined expelled gases were collected in 1 liter of triple distilled water. A measurement was made for $ClO_2$ by the spectrophotometer and calculated against a standard curve. 131 g. $ClO_2$ were found which corresponds approximately to a 98.2% yield.

The remaining reactants were dried and the residue examined. Tests for chloride, nitrate and nitrite were positive.

(B) 110 g. $KClO_3$+360 g. $HNO_3$ 70%+174 g. NaCl were allowed to react in a partial pressure chamber at 40° C. After ½ hr., 5 minutes after the yellow color in solution had disappeared, the chamber and solution were aerated for a period of time. The total time was 36 minutes. The combined expelled gases were collected in 1 liter of triple distilled water. A measurement was made for $ClO_2$ by the spectrophotometer and calculated against a standard curve. Actual yield 129 g. $ClO_2$=96.5%.

(C) 357 g. $Ba(ClO_3)_2$+360 g. 70% $HNO_3$+174 g. NaCl were allowed to react in a partial pressure chamber at 40° C. After ½ hr., 5 minutes after the yellow color in solution had disappeared, the chamber and solution were aerated for a period of time. The total time was 36 minutes. The combined expelled gases were collected in 1 liter of triple distilled water. A measurement was made for $ClO_2$ by the spectrophotometer and calculated against a standard curve. 130 g. $ClO_2$=98% yield.

(D) 80 g. $NaClO_2$+360 g. $HNO_3$+174 g. NaCl were allowed to react in a partial pressure chamber at 40° C. After ½ hr., 5 minutes after the yellow color in solution had disappeared, the chamber and solution were aerated for a period of time. The total time was 36 minutes. The combined expelled gases were collected in 1 liter of triple distilled water. A measurement was made for $ClO_2$ by the spectrophotometer and calculated against a standard curve. 130 g. $ClO_2$=98% yield.

(E) 106 g. $NaClO_3$+720 g. 70% $HNO_3$+174 g. NaCl were allowed to react in a partial pressure chamber at 40° C. After ½ hr., 5 minutes after the yellow color in solution had disappeared, the chamber and solution were aerated for a period of time. The total time was 36 minutes. The combined expelled gases were collected in 1 liter of triple distilled water. A measurement was made for $ClO_2$ by the spectrophotometer and calculated against a standard curve. 130 g. $ClO_2$+60 g. $NO_2$ were formed=98% yield.

(F) 106 g. $NaClO_3$+360 g. 70% $HNO_3$+348 g. NaCl were allowed to react in a partial pressure chamber at 40° C. After ½ hr., 5 minutes after the yellow color in solution had disappeared, the chamber and solution were aerated for a period of time. The total time was 36 minutes. The combined expelled gases were collected in 1 liter of triple distilled water. A measurement was made for $ClO_2$ by the spectrophotometer and calculated against a standard curve. 130 g. $ClO_2$+40 g. Cl+5 g. NOCl were found.

(G) 212 g. $NaClO_3$+360 g. 70% $HNO_3$+174 g. NaCl were allowed to react in a partial pressure chamber at 40° C. After ½ hr., 5 minutes after the yellow color in solution had disappeared, the chamber and solution were aerated for a period of time. The total time was 36 minutes. The combined expelled gases were collected in 1 liter of triple distilled water. A measurement was made for $ClO_2$ by the spectrophotometer and calculated against a standard curve. 132 g. $ClO_2$ formed=99% yield plus 40 g. $NaClO_3$+5 g. $NaClO_2$.

(H) 80 g. $NaClO_2$ or 106 g. $NaClO_3$+720 g. $HNO_3$ 70%+348 g. NaCl formed 254 g. $ClO_2$=95% yield.

What is claimed is:

1. A process of producing chlorine dioxide which comprises reacting substantially molar proportions of nitrosyl chloride and a chlorate of an alkali metal or alkaline earth metal, whereby chlorine dioxide is formed and recovering the chlorine dioxide.

2. A process as claimed in claim 1, wherein the nitrosyl chloride is formed in situ by reaction of nitric acid and alkali metal chloride.

3. A process of producing chlorine dioxide which comprises reacting substantially 3 moles of alkali metal chloride, 4 moles of concentrated nitric acid and 1 mole of a chlorate of an alkali metal or alkaline earth metal, whereby nitrosyl chloride is intermediarily formed which reacts with said chlorate to form chlorine dioxide, and recovering the chlorine dioxide.

4. A process as claimed in claim 3, wherein the reaction is carried out at a temperature between room temperature and about 60° C.

5. A process as claimed in claim 3, wherein the reaction is carried out at normal or reduced pressure.

6. A process as claimed in claim 3, wherein said chloride and said chlorate are premixed prior to the reaction with the nitric acid.

7. A process as claimed in claim 3, wherein said nitric acid and said chlorate are premixed prior to the reaction with said chloride.

8. A process as claimed in claim 1, wherein the reaction is carried out with a mixture of said chlorate and a chlorite of an alkali metal or alkaline earth metal.

References Cited

UNITED STATES PATENTS

| 2,616,792 | 11/1952 | Marks et al. | 423—479 |
| 2,863,722 | 12/1958 | Rapson | 423—478 |
| 2,871,097 | 1/1959 | Rapson | 423—478 |
| 3,563,702 | 2/1971 | Partridge et al. | 423—478 |

OTHER REFERENCES

McPherson & Henderson book, "A Course in General Chemistry," Third ed., 1927, p. 285, Ginn & Co., New York.

EDWARD STERN, Primary Examiner

U.S. Cl. X.R.

423—477